Figure 1:
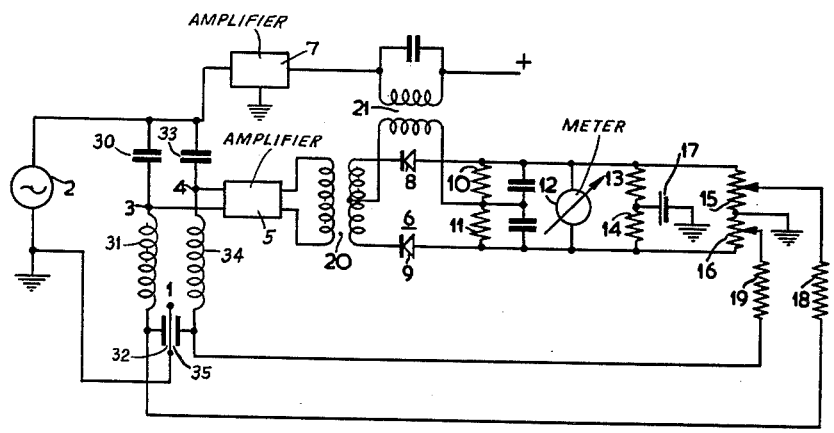

Dec. 4, 1962   J. J. OPSTELTEN ETAL   3,066,535
DEVICE FOR MEASURING LOW PRESSURES
Filed May 28, 1957

INVENTORS
JOHANNES JACOBUS OPSTELTEN
NICOLAAS WARMOLTZ
JOHANNES JACOBUS ZAALBERG VAN ZELST
BY
AGENT

United States Patent Office 3,066,535
Patented Dec. 4, 1962

3,066,535
DEVICE FOR MEASURING LOW PRESSURES
Johannes Jacobus Opstelten, Nicolaas Warmoltz, and Johannes Jacobus Zaalberg van Zelst, all of Eindhoven, Netherlands, assignors to North American Philips Company Inc., New York, N.Y., a corporation of Delaware
Filed May 28, 1957, Ser. No. 662,226
4 Claims. (Cl. 73—398)

The present invention relates to a low pressure measuring arrangement. More particularly, the invention relates to an arrangement for measuring low pressures, which comprises a differential capacitor with two fixed electrodes and an intermediate third movable electrode. The last-mentioned electrode may be a diaphragm, which is acted upon by the medium whose pressure is to be determined. The measurement consists in determining the capacity difference of the capacitors constituted by the movable electrode on the one hand and each of the fixed electrodes on the other hand.

This type of capacitor construction is also used for capacitor microphones. An alternating voltage is supplied to the capacitor elements of the capacitor microphone through coupling elements, which alternating voltage is modulated by the displacement of the movable electrode between the fixed electrodes, the movable electrode being actuated in response to an oral signal. The modulated alternating voltage is demodulated after amplification and the modulation voltage thus obtained, which has the frequency at which the intermediate electrode oscillates, is supplied to a reproducing device.

For capacitor microphones operating in this manner, it has been proposed to employ inverse feedback for certain cases. For this purpose, a modulation voltage is derived from the modulated voltage, which modulation voltage is fed back as an inverse feedback voltage to the electrodes of the differential capacitor. However, in these cases, the modulated voltage is derived in a different manner.

Thus, in a known circuit-arrangement utilized in the cases of this type, the alternating voltage, which is derived from an oscillator, and which is active between the movable electrode and one of the fixed electrodes, is consequently modulated by the displacement of the movable electrode. The feedback modulation voltage, which is derived from this modulated alternating voltage, acts between the movable electrode and the other fixed electrode.

The invention has for its object to provide an arrangement of the type referred to in the preamble for measuring low static pressures to a high degree of accuracy. Preferably, a symmetrical differential capacitor is used, so that, in the rest position, its fixed electrodes occupy a symmetrical position relative to the movable intermediate electrode.

In accordance with the invention, in such an arrangement an alternating voltage is supplied through coupling elements to the capacitor electrodes, which voltage is modulated in accordance with the pressure acting on the movable electrode and in which, in addition to providing a voltage for indication purposes, provides a modulating voltage derived from the modulated alternating potential. The voltage derived from the modulated alternating voltage is supplied as an inverse feedback voltage to the differential capacitor via a potentiometer, one point of which is connected to the intermediate electrode and two points of which, one at each side of the first-mentioned point, are connected to the fixed electrodes, so that the inverse feedback voltages invariably have opposite polarities with respect to the intermediate electrode, while the fixed electrodes have a fixed, preferably variable bias with respect to the intermediate electrode. This bias is preferably derived from a stabilized source of voltage, preferably a high tension unit, the output voltage of which may be stabilized by means of one or more glow-discharge tubes.

Figure 2:
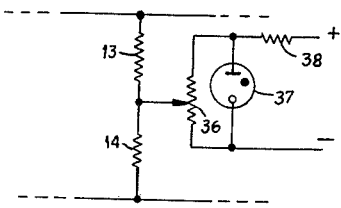

In order that the invention may be readily carried into effect an example of the arrangement in accordance with the invention will now be described in detail with reference to the accompanying drawings, in which:

FIG. 1 is a schematic diagram, illustrated partially in block form, of a circuit arrangement of the present invention; and FIG. 2 is a schematic diagram of a voltage regulator utilized in a modified circuit arrangement, only partially illustrated therein, of the present invention.

Referring to FIG. 1, a differential capacitor 1 serves as a take-up element for the pressure to be measured. It comprises two outer, stationary, plate-shaped electrodes and a movable intermediate electrode which is directly or indirectly acted upon by the medium, the pressure of which is to be determined. An alternating voltage produced by an oscillator 2 is supplied to two parallel paths, the first of which consists of capacitor 30, inductor 31 and one section of the capacitor 1 shown at 32. The second path is formed by the capacitor 33, inductor 34 and the other section of the capacitor 1 shown at 35. Upon displacement of the movable capacitor electrode, the capacity between this electrode and one of the fixed electrodes increases and the capacity between this electrode and the other fixed electrode decreases, hence the potential difference at the output, such as between the points 3 and 4, of the coupling elements changes. In a symmetrical structure, this potential difference is equal to zero in the absence of a pressure difference at both sides of the diaphragm acted upon by the pressure and serving as a primary take-up member. The phase difference between the voltages at points 3 and 4 depends upon the sense of deflection of the intermediate electrode. The voltage between points 3 and 4 is amplified in an amplifier 5 and the amplified modulated voltage is demodulated in a demodulator 6 which is represented diagrammatically. The output voltage of the amplifier 5 is supplied to the demodulator 6 through a transformer 20. The demodulator comprises two rectifiers 8 and 9 and resistors 10 and 11. Connected between the midpoint of the secondary winding of the transformer 20 and the common point of the mutually equal resistors 10 and 11 is the secondary winding of a transformer 21. The primary winding of the transformer 21 constitutes the output circuit of an amplifier 7 the input voltage of which is taken from the oscillator. The voltage supplied by the oscillator may have a frequency of the order of 500 kc./s.

The demodulator as described is known. In this instance the voltage across the resistors 10 and 11 varies in polarity with the sense of deflection of the intermediate electrode of the differential capacitor. This voltage is a measure of the pressure to be measured and is indicated by means of the device 12.

An inverse feedback voltage is taken from the series-combination of two resistors 15 and 16, which is connected in parallel with the series-combination of the resistors 10 and 11. In the example shown in the drawing, the movable electrode is connected to a point at ground potential. The inverse feedback voltages are supplied by way of resistors 18 and 19 to the fixed electrodes of the capacitor. The common point of the two equal resistors 13 and 14, which are connected in series across the demodulator output, also has a fixed potential. If the sliding contacts of the resistors 15 and 16 are set to symmetrical points, equal voltages are applied to the fixed electrodes of the differential capacitor in the absence of a voltage from the source 17. Under these conditions the attraction forces between the movable electrode and each of the fixed electrodes of capacitor 1 are equal, so that no feedback effect occurs. However, when the voltage of the source 17 has a finite value, the algebraic sums of the voltage of the source 17 and each of the voltages produced at the tappings of resistors 15 and 16 are different respectively. As a result, the absolute value of the voltage on one fixed electrode, upon a deflection of the movable electrode, becomes different from the absolute value of the voltage on the other electrode. The polarity of the feedback voltages is such that the force produced tends to urge the movable electrode back to its central position.

In order to obtain an accurate measurement, the voltage of the source 17 should be constant. The value of this voltage determines the degree of inverse feedback. Said voltage source is preferably a high tension unit which is supplied from the supply source and the output voltage of which is stabilized by means of one or more glow-discharge tubes. For this purpose, the circuit arrangement of this invention may be modified, for example, as shown in FIG. 2, which for the sake of clarity, illustrates only the resistors 13 and 14 and the modified part coupled thereto. Thus, the adjustable arm of potentiometer 36 is coupled to the common junction of resistors 13 and 14. Potentiometer 36 is connected in parallel to the gas tube 37 of a gas tube regulator circuit which also includes a resistor 38 and suitable voltage source (not shown) and whose operation is well known to those skilled in the art. The measuring range is variable by modifying the voltage of the source 17, FIG. 1, or varying the output of potentiometer 36, FIG. 2.

For the demodulator of the aforesaid type there may be substituted a demodulator which supplies at the same time a direct voltage that serves as the bias for the fixed electrodes. In this instance, source 17 is no longer required. This modification is particularly adaptable to applications in which lesser degrees of accuracy are tolerable.

While the invention has been described by means of a specific example and in a specific embodiment, we do not wish to be limited thereto, for obvious modifications will occur to those skilled in the art without departing from the spirit and scope of the invention.

We claim:
1. A circuit arrangement for measuring relatively low pressures, said arrangement comprising a differential capacitor having first and second electrodes and an intermediate electrode, said intermediate electrode having a predetermined position with respect to each of said first and second electrodes in the absence of said respective pressures, and said intermediate electrode further being movable from said predetermined position relative to each of said first and second electrodes in accordance with said respective pressures to be measured, means for applying an alternating voltage having a given frequency to said first and second electrodes, said alternating voltage being modulated in accordance with the respective relative positions of said movable electrode from said predetermined position, detection means for detecting said modulated alternating voltage, said detection means comprising means for providing a signal having amplitude and phase variations as determined by the extent and sense of the departure of said intermediate electrode from said predetermined position, a source of phase reference signal having a frequency equal to said given frequency, a demodulator and means to apply said first signal and said phase reference signal to said demodulator to provide said detected modulated alternating voltage, a source of bias potential, said bias potential being applied between said intermediate electrode and each of said first and second electrodes, respectively, means for combining said bias potential and detected modulated alternating voltage to provide an inverse feedback voltage, a potentiometer having first and second spaced tapping points and an intermediate tapping point between said first and second tapping points, means for applying said feedback voltage across points, means for applying said feedback voltage across said potentiometer, means coupling the intermediate tapping point of said potentiometer to said intermediate electrode and said first and second tapping points to said first and second electrodes, respectively, to oppose the respective movements of said intermediate electrode from said predetermined position, and indicating means responsive to said detected modulated alternating voltage for determining said respective pressures.

2. A circuit arrangement for measuring relatively low pressure, comprising a differential capacitor having first and second electrodes and an intermediate electrode, said intermediate electrode being movable from a substantially central position relative to said first and second electrodes in accordance with the pressure to be measured, first circuit means including said first and intermediate electrodes having a point thereof at varying potential as determined by the spacing between said first and intermediate electrodes, second circuit means including said second and intermediate electrodes having a point thereof at varying potential as determined by the spacing between said second and intermediate electrodes, means for applying an alternating voltage to said first and second circuit means thereby to provide at said points an alternating voltage modulated in accordance with the position of said intermediate electrode relative to the said first and second electrodes, signal detector means connected to said points of the circuit means for producing a measuring voltage having variations as determined by the variations of the modulated alternating voltage, a source of biasing potential, means for deriving from the said measuring voltage a first inverse feedback voltage component of one polarity and a second inverse feedback voltage component of opposite polarity, means for combining said biasing potential and said first feedback voltage component and applying the same to said first and intermediate electrodes, and means for combining said biasing potential and said second feedback voltage component and applying the same to said second and intermediate electrodes.

3. A circuit arrangement for measuring relatively low pressure, comprising a differential capacitor having first and second electrodes and an intermediate electrode, said intermediate electrode being movable from a substantially central position relative to said first and second electrodes in accordance with the pressure to be measured, first circuit means including said first and intermediate electrodes having a point thereof at varying potential as determined by the spacing between said first and intermediate electrodes, second circuit means including said second and intermediate electrodes having a point thereof at varying potential as determined by the spacing between said second and intermediate electrodes, means for applying an alternating voltage to said first and second circuit means thereby to provide at said points an alternating voltage modulated in accordance with the position of said intermediate electrode relative to the said first and second electrodes, signal detector means connected to said points of the circuit means for producing a detector voltage having variations as determined by variations of the modulated alternating voltage, a potentiometer having first and second spaced tapping points and an intermediate tapping point, means for applying said detector voltage across said potentiometer, means connecting the intermediate point of said potentiometer to the intermediate electrode, means connecting the first tapping point to said first electrode, means connecting the second tapping point of said potentiometer to said second electrode, and means for applying a biasing potential to said intermediate tapping thereby to bias the intermediate electrode with respect to said first and second electrodes.

4. A circuit arrangement for measuring relatively low pressure, comprising a differential capacitor having first and second electrodes and an intermediate electrode, said intermediate electrode being movable from a substantially central position relative to said first and second electrodes in accordance with the pressure to be measured, first circuit means comprising in series connection a first inductance and said first intermediate electrodes, said series connection having a junction point at varying potential as determined by the spacing between said first and intermediate electrodes, second circuit means comprising in series connection a second inductance and said second and intermediate electrodes, said series connection having a junction point at varying potential as determined by the spacing between said second and intermediate electrodes, means for applying an alternating voltage to said first and second circuit means thereby to provide at said points an alternating voltage modulated in accordance with the position of said intermediate electrode relative to the said first and second electrodes, signal detector means connected to said points of the circuit, means for producing a detector voltage having amplitude variations as determined by the variations of the modulated alternating voltage, means for indicating the intensity of said detector voltage, a source of biasing potential, means for deriving from the said detector voltage a first inverse feedback voltage component of one polarity and a second inverse feedback voltage component of opposite polarity, means for combining said biasing potential and said first feedback voltage component and applying the same to said first and intermediate electrodes, and means for combining said biasing potential and said second feedback voltage component and applying the same to said second and intermediate electrodes.

References Cited in the file of this patent

UNITED STATES PATENTS

| | | |
|---|---|---|
| 2,567,253 | Strange et al. | Sept. 11, 1951 |
| 2,829,520 | Stanton | Apr. 8, 1958 |

FOREIGN PATENTS

| | | |
|---|---|---|
| A16,792 | Germany | July 5, 1956 |